Patented Nov. 12, 1935

2,020,672

UNITED STATES PATENT OFFICE 2,020,672

HYDRATION OF OLEFINES

Henry Dreyfus, London, England

No Drawing. Application October 28, 1932, Serial No. 640,002. In Great Britain December 22, 1931

9 Claims. (Cl. 260—156)

This invention relates to the hydration of olefines, and especially to the manufacture of diethyl alcohol and/or diethyl ether by the hydration of ethylene.

I have found that the hydration of ethylene can be effected in a very satisfactory manner by leading mixtures of ethylene and steam in contact with liquid or molten hydration or dehydration catalysts or through molten or liquid baths containing the same. As instances of such catalysts may be mentioned acid sulphates, such as bisulphates and pyrosulphates, especially bisulphates and pyrosulphates of the alkali metals, partially hydrated calcium chloride or magnesium chloride, zinc chloride, or mixtures of such chlorides, one or more phosphoric acids, metaphosphates or other phosphates of the alkali or other metals, and especially low melting mixtures of such phosphates, e. g. mixtures of sodium and lithium metaphosphates. I prefer to use as catalysts calcium chloride or chlorides of an acid character, such as magnesium chloride or other catalysts of acid character, such, for instance, as bisulphates and pyrosulphates.

The process may be performed at temperatures upwards of about 100° C. and especially at temperatures between about 150° and 350° C. or more. Elevated pressures are useful for accelerating the reaction, for example pressures up to 15 to 25 atmospheres or more. While moderately elevated pressures, e. g. below about 25 atmospheres, are generally very useful, higher or considerably higher pressures may be employed.

The mixtures of ethylene and steam may be brought into contact with the liquid or molten catalysts in any convenient way. For instance they may be passed under the desired pressure through a molten bath comprising one or more of the catalysts of the invention, contained in an appropriate vessel and kept at the desired temperature and such a bath may if desired also comprise other substances, especially substances of low melting point, which may or may not exert a catalytic effect on the reaction. In another method of applying the invention the mixture of olefine and water vapor may be passed in counter-current to the molten or liquid catalyst, e. g. up towers or the like down which the liquid or molten catalysts are caused to fall or trickle. Advantageously the reaction mixtures may be preheated to the reaction temperature or other convenient temperature before coming into contact with the liquid or molten catalysts.

The ethylene and steam may be present in the mixtures to be employed in any convenient proportion, according to the nature of the desired hydration products. Thus if substantial quantities of diethyl ether are to be obtained, a mixture comprising about two or more volumes of ethylene to each volume of water vapor may be employed. If, on the other hand, ethyl alcohol is to be the main product, mixtures containing more water vapor, for instance equal volumes of ethylene and water vapor, may be used. Usually mixtures containing substantially equimolecular proportions or containing some excess of ethylene are to be preferred, since the use of such mixtures facilitates the recovery of concentrated or highly concentrated alcohol from the reaction products. If desired inert or diluent gases or vapors, such as nitrogen, may also be present.

If, instead of mixtures of ethylene and steam, mixtures of higher olefines and steam are employed, the corresponding higher alcohols and ethers can readily be obtained by means of the invention. Thus, for instance, isopropyl alcohol can readily be obtained if mixtures of propylene and steam are employed. If desired, the mixtures may contain a plurality of olefines, whether or not they contain ethylene, and from such mixtures mixtures of alcohols can readily be obtained.

The following example illustrates the invention but is not to be considered as in any way limiting it.

*Example*

A mixture comprising approximately 3 volumes of ethylene and 2 volumes of steam is preheated to about 200° C., and subsequently passed through molten barium pyrosulphate or through molten zinc chloride maintained at a temperature of 300° C., under a pressure of 20 atmospheres. The vapors on leaving the reaction vessel are cooled, if desired while still under pressure, and the ethyl alcohol formed is condensed and may be separated from the water remaining after the reaction and any ether formed in the reaction in any convenient way. Advantageously any ethylene remaining is mixed with further water vapor and recirculated through the reaction zone.

What I claim and desire to secure by Letters Patent is:—

1. Process for the hydration of olefines which comprises contacting an olefine with water vapor in the presence of a molten salt which is a hydration catalyst.

2. Process according to claim 1, in which the hydration is effected at a temperature between 150° and 350° C.

3. Process according to claim 1, in which the hydration is effected under superatmospheric pressure.

4. Process for the hydration of olefines which comprises contacting an olefine with water vapor in the presence of a molten salt of sulphuric acid containing a higher proportion of sulphuric anhydride than do the normal sulphates.

5. Process for the hydration of olefines which comprises contacting an olefine with water vapor in the presence of a molten chloride selected from the group consisting of calcium chloride, zinc chloride and magnesium chloride.

6. Process for producing ethanol, which comprises the steps of preheating a mixture containing between one and two volumes of ethylene and one volume of steam and passing the mixture in contact with a molten salt of sulphuric acid containing a higher proportion of sulphuric anhydride than do the normal sulphates, at a temperature between 150° and 350° C., and under a pressure between 1 and 25 atmospheres.

7. Process for producing diethyl ether, which comprises the steps of preheating a mixture containing at least two volumes of ethylene and one volume of steam and passing the mixture in contact with a molten salt of sulphuric acid containing a higher proportion of sulphuric anhydride than do the normal sulphates, at a temperature between 150° and 350° C., and under a pressure between 1 and 25 atmospheres.

8. Process for producing ethanol, which comprises the steps of preheating a mixture containing between one and two volumes of ethylene and one volume of steam and passing the mixture through a molten bath comprising as the essential constituent a molten salt of sulphuric acid containing a higher proportion of sulphuric anhydride than do the normal sulphates.

9. Process for producing ethanol, which comprises the steps of preheating a mixture containing between one and two volumes of ethylene and one volume of steam and passing the mixture in countercurrent to a stream comprising as the essential constituent a molten salt of sulphuric acid containing a higher proportion of sulphuric anhydride than do the normal sulphates.

HENRY DREYFUS.